(12) United States Patent
Onishi

(10) Patent No.: US 11,885,389 B2
(45) Date of Patent: Jan. 30, 2024

(54) BRACKET

(71) Applicant: Prospira Corporation, Kawasaki (JP)

(72) Inventor: Tadashi Onishi, Tokyo (JP)

(73) Assignee: Prospira Corporation, Kawasaki (JP)

(*) Notice: Subject to any disclaimer, the term of this patent is extended or adjusted under 35 U.S.C. 154(b) by 279 days.

(21) Appl. No.: 17/596,124

(22) PCT Filed: Jan. 28, 2020

(86) PCT No.: PCT/JP2020/002976
§ 371 (c)(1),
(2) Date: Dec. 3, 2021

(87) PCT Pub. No.: WO2020/261627
PCT Pub. Date: Dec. 30, 2020

(65) Prior Publication Data
US 2022/0316551 A1 Oct. 6, 2022

(30) Foreign Application Priority Data
Jun. 28, 2019 (JP) .................................. 2019-121730

(51) Int. Cl.
*B60K 5/12* (2006.01)
*F16F 15/08* (2006.01)
*F16F 1/36* (2006.01)

(52) U.S. Cl.
CPC ............ *F16F 15/08* (2013.01); *B60K 5/1208* (2013.01); *F16F 1/36* (2013.01)

(58) Field of Classification Search
CPC . F16F 15/08; F16F 1/36; F16F 1/3849; B60K 5/1208

(Continued)

(56) References Cited

U.S. PATENT DOCUMENTS 9,562,587 B2 * 2/2017 Pichel .................... F16F 1/3863
10,876,593 B2 * 12/2020 Shimada ................. F16F 1/376
(Continued)

FOREIGN PATENT DOCUMENTS

| CN | 102483116 A | 5/2012 |
| CN | 102562939 A | 7/2012 |

(Continued)

OTHER PUBLICATIONS

Jun. 6, 2023, search result of the Extended European Search Report issued by the European Patent Office in the corresponding European Patent Application No. 20832338.6.

(Continued)

*Primary Examiner* — Kimberly T Wood
(74) *Attorney, Agent, or Firm* — KENJA IP LAW PC

(57) ABSTRACT

A bracket with an excellent reinforcing effect is provided. A bracket (1) with an opening (A) includes a body (10) and a reinforcement portion (20). The body (10) is made of resin. The body (10) includes a pair of column portions (11) and a pair of connecting portions (12, 13). The body (10) includes a plate portion (15) on at least one of the column portions (11). The plate portion (15) is provided with ribs (16 to 18) that extend from the side of the opening (A) to the bracket outer peripheral side and protrude in the opening penetration direction. The reinforcement portion (20) includes a reinforcement portion (21). The reinforcement portion (21) forms an outer peripheral face (f1) of the bracket (1). The reinforcement portion (21) is arranged so as to overlap the ribs (16 to 18) when viewed in the opening penetration direction.

18 Claims, 7 Drawing Sheets

(58) Field of Classification Search
USPC .......................................................... 248/562
See application file for complete search history.

(56) References Cited

U.S. PATENT DOCUMENTS

| | | | |
|---|---|---|---|
| 2007/0178258 A1* | 8/2007 | Petit .................. | F16F 13/10 |
| | | | 428/34.1 |
| 2010/0264570 A1 | 10/2010 | Thierry et al. | |
| 2012/0097827 A1 | 4/2012 | Klink et al. | |
| 2012/0146270 A1 | 6/2012 | Kato | |
| 2012/0160986 A1 | 6/2012 | Hein et al. | |
| 2017/0036526 A1* | 2/2017 | Horseman ............ | B60K 5/1208 |
| 2020/0300326 A1 | 9/2020 | Onishi et al. | |

FOREIGN PATENT DOCUMENTS

| | | | | |
|---|---|---|---|---|
| CN | 107131249 A | * | 9/2017 | .............. F16F 15/08 |
| CN | 108146218 A | * | 6/2018 | ........... B60K 5/1208 |
| JP | H1163107 A | | 3/1999 | |
| JP | 2006161973 A | | 6/2006 | |
| JP | 2007321921 A | | 12/2007 | |
| JP | 2009036295 A | | 2/2009 | |
| JP | 2012202418 A | | 10/2012 | |
| JP | 2012530647 A | | 12/2012 | |
| JP | 2013072534 A | | 4/2013 | |
| JP | 2013119879 A | | 6/2013 | |
| JP | 2013164150 A | | 8/2013 | |
| JP | 2013167264 A | | 8/2013 | |
| JP | 2017155754 A | | 9/2017 | |
| JP | 2019078380 A | | 5/2019 | |
| JP | 2019094965 A | | 6/2019 | |

OTHER PUBLICATIONS

Mar. 24, 2020, International Search Report issued in the International Patent Application No. PCT/JP2020/002976.

Nov. 15, 2022, search result of Office Action issued by the China National Intellectual Property Administration in the corresponding Chinese Patent Application No. 202080040198.X.

Nov. 28, 2021, International Preliminary Report on Patentability issued in the International Patent Application No. PCT/JP2020/002976.

* cited by examiner

BRACKET

TECHNICAL FIELD

The present disclosure relates to a bracket that has an opening for mounting an anti-vibration member connected to one of a vibration generating side and a vibration receiving side, and that can be connected to the other of the vibration generating side and the vibration receiving side.

BACKGROUND

Some known brackets include a reinforcement member made from glass fiber fabric bonded to a synthetic resin material that serves as the main body of the bracket, and a plurality of reinforcement ribs on the outer periphery of the bracket, extending along the outer periphery. See, for example, Patent Literature (PTL) 1. According to the bracket disclosed in PTL 1, the inclusion of the reinforcement ribs in addition to the reinforcement member can increases the reinforcing effect on the bracket.

CITATION LIST

Patent Literature

PTL 1: JP 2013-167264 A

SUMMARY

Technical Problem

However, the above-described known bracket still has room for improvement in the reinforcing effect on the bracket.

An aim of the present disclosure is to provide a bracket that has an excellent reinforcing effect.

Solution to Problem

A bracket according to the present disclosure is a bracket that has an opening for mounting an anti-vibration member connected to one of a vibration generating side and a vibration receiving side, and that can be connected to the other of the vibration generating side and the vibration receiving side, the bracket including a bracket body and a reinforcement portion, wherein the bracket body is made of resin, the bracket body includes a pair of column portions that are spaced apart and a pair of connecting portions arranged between the pair of column portions and connecting the pair of column portions, the bracket body further includes at least one plate portion, on at least one column portion in the pair of column portions, extending in an extending direction of the column portion and protruding in an extending direction of the connecting portions more than the column portion, and a rib extending from a side of the opening to a bracket outer peripheral side and protruding in a penetration direction of the opening is provided on the plate portion, the reinforcement portion includes a bracket outer peripheral side reinforcement portion, the bracket outer peripheral side reinforcement portion forms an outer peripheral face of the bracket, and the bracket outer peripheral side reinforcement portion is arranged so as to overlap the rib when viewed in the penetration direction of the opening. The bracket according to the present disclosure has an excellent reinforcing effect.

In the bracket according to the present disclosure, the reinforcement portion preferably includes a bracket inner peripheral side reinforcement portion, and the bracket inner peripheral side reinforcement portion preferably forms an inner peripheral face of the bracket. In this case, the bracket has an even better reinforcing effect.

In the bracket according to the present disclosure, the bracket inner peripheral side reinforcement portion is preferably a band-shaped reinforcement member and is formed in an annular shape by joining two longitudinal ends of the reinforcement member, and a joint formed by joining the two longitudinal ends is preferably inclined relative to the penetration direction of the opening. In this case, at the bracket inner peripheral side reinforcement portion, the reinforcing effect against a force along the peripheral direction of the inner peripheral face of the bracket and a force perpendicular to or inclined relative to the inner peripheral face of the bracket, that is, a force to bend the inner peripheral face of the bracket, can be improved.

In the bracket according to the present disclosure, the joint can intersect a weld line formed in the bracket body. In this case, the weld line present in the bracket body can be reinforced.

In the bracket according to the present disclosure, the joint is preferably formed at a position that does not intersect the weld line. In this case, the entire weld line can reliably be reinforced.

In the bracket according to the present disclosure, the bracket outer peripheral side reinforcement portion preferably includes a tapered portion that is tapered from one of the connecting portions towards the plate portion when viewed in the extending direction of the column portion. This further improves the durability of the bracket.

In the bracket according to the present disclosure, the at least one plate portion preferably includes two plate portions spaced apart in the penetration direction of the opening, and the bracket outer peripheral side reinforcement portion preferably further extends from the connecting portion between the two plate portions in the extending direction of the column portion. This further improves the durability of the bracket.

Advantageous Effect

According to the present disclosure, a bracket that has an excellent reinforcing effect can be provided.

DETAILED DESCRIPTION

Brackets according to some embodiments of the present disclosure are described below with reference to the drawings.

Figure 1:
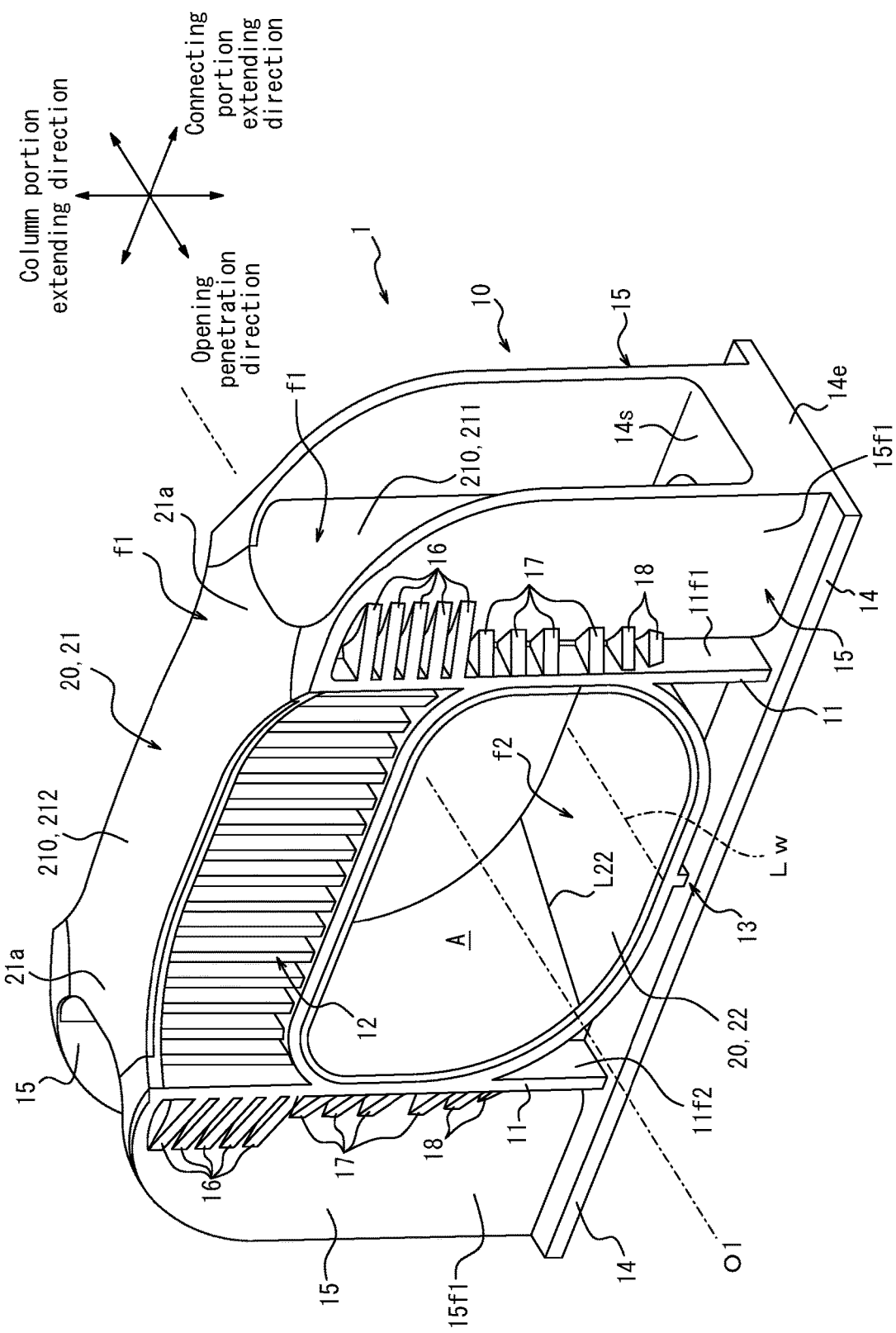
FIG. 1 is a perspective view schematically illustrating a bracket according to a first embodiment of the present disclosure.

FIG. 1 is a perspective view schematically illustrating a bracket 1 according to a first embodiment of the present disclosure.

The bracket 1 has an opening A for mounting an anti-vibration member (not illustrated) connected to one of a vibration generating side and a vibration receiving side, and can be connected to the other of the vibration generating side and the vibration receiving side. The bracket 1 according to the present embodiment is a bracket for an engine mount. Examples of the vibration generating side and the vibration receiving side include an engine and a vehicle body. Specifically, the vibration generating side or the vibration receiving side can be the engine. Examples of the anti-vibration member include an anti-vibration member in which an inner cylinder and an outer cylinder are connected by an elastic body (such as rubber). In the case of the anti-vibration member, the outer cylinder is mounted to the bracket 1 while the inner cylinder is mounted to the engine. The anti-vibration member is omitted in FIG. 1. On the other hand, the other one of the vibration generating side and the vibration receiving side can be the car body. In this case, the bracket 1 can be fixed to the car body as described below.

The bracket 1 includes a bracket body 10 and a reinforcement portion 20. In the present embodiment, the reinforcement portion 20 is a compound material with improved strength by inclusion of a synthetic resin in a fibrous element, i.e. a fiber reinforced plastic (FRP). Examples of the fiber reinforced plastic include prepreg. Examples of the fibrous elements include glass fiber fabrics, carbon fiber fabrics, metal fiber fabrics, organic fibers, fiber fabrics having a higher flexural strength than the bracket body 10, fabrics thereof, and the like. A glass fiber fabric is preferably used as the fibrous element. Further examples of the fiber reinforced plastic include a Uni Direction (UD) material in which a synthetic resin is included in a fibrous element having a directional property, and a woven material in which a synthetic resin is included in a woven fibrous element. In the present embodiment, the bracket 1 can, for example, be integrally formed by injection molding with the reinforcement portion 20 as an insert.

The bracket body 10 is made of resin. Examples of the resin include a thermoplastic synthetic resin and a thermosetting synthetic resin. A thermoplastic synthetic resin is preferably used as the synthetic resin. Examples of such a thermoplastic synthetic resin include 6-6 nylon, 6 nylon, polypropylene, and the like.

The bracket body 10 has a pair of column portions 11 that are spaced apart and a pair of connecting portions 12 and 13 arranged between the pair of column portions 11 and connecting the pair of column portions 11. In the present embodiment, the two column portions 11 of the bracket body 10 are formed as plate portions extending parallel to each other. In the present embodiment, the column portions 11, together with the reinforcement portion 20, form the side walls of the bracket 1. In the present embodiment, the column portions 11 of the bracket body 10 extend in the up-down direction when the bracket 1 is fixed to the vehicle body. On the other hand, in the present embodiment, the connecting portions 12 and 13 of the bracket body 10 respectively configure a bridging portion of the bracket body 10 (bridging portion 12) and a base portion of the bracket body 10 (base portion 13). In the present embodiment, the bridging portion 12 forms an upper wall of the bracket 1 together with the reinforcement portion 20. In the present embodiment, the bridging portion 12 is located upward when the bracket 1 is fixed to the vehicle body. Also in the present embodiment, the base portion 13 forms a lower wall of the bracket 1 together with the reinforcement portion 20. In the present embodiment, the base portion 13 is located downward when the bracket 1 is fixed to the vehicle body.

Here, the penetration direction of the opening (opening penetration direction) is the direction in which the opening A penetrates. In the present embodiment, the opening penetration direction is a direction extending parallel to a central axis O1 of the opening A. The column portion extending direction is the direction in which the column portions 11 extend. In the present embodiment, the two column portions 11 extend parallel to each other. Furthermore, the connecting portion extending direction is the direction in which the connecting portions 12 and 13, that is, the bridging portion 12 and the base portion 13, extend. In the present embodiment, the bridging portion 12 and the base portion 13 extend parallel to each other.

Furthermore, the bracket body 10 includes a plate portion 15, on at least one column portion 11 in the pair of column portions 11, extending in the extending direction of the column portion 11 and protruding in the extending direction of the connecting portions 12 and 13 more than the column portion 11. In the present embodiment, the plate portion 15 forms a part of the bracket body 10 by protruding from the column portion 11. Specifically, in the present embodiment, the plate portion 15 protrudes from a bracket outer peripheral side face 11/1 of the column portion 11. In the present embodiment, the plate portion 15 extends over the entire extending direction of the column portion 11. Furthermore, in the present embodiment, the bracket body 10 includes plate portions 15 on each of the two column portions 11. In the present embodiment, when the bracket 1 is fixed to the vehicle body, the extending direction of the column portions 11 is the vehicle up-down direction. That is, in the present embodiment, when the bracket 1 is fixed to the vehicle body, the plate portions 15 are configured to extend over the entire vehicle up-down direction of the column portion 11. In addition, in the present embodiment, when the bracket 1 is fixed to the vehicle body, the extending direction of the bridging portion 12 and the base portion 13 (connecting portion extending direction) is the horizontal direction. Specifically, the connecting portion extending direction can be the vehicle front-rear direction and/or the vehicle left-right direction (vehicle width direction). In the present embodiment, the connecting portion extending direction is the vehicle front-rear direction. That is, in the present embodiment, when the bracket 1 is fixed to the vehicle body, the two plate portions 15 of one of the two column portions 11 are configured to protrude in the vehicle front direction more than the column portion 11. In the present embodiment, the two plate portions 15 of the other one of the column portions 11 are configured to protrude in the vehicle rear direction more than the column portions 11.

Figure 2:
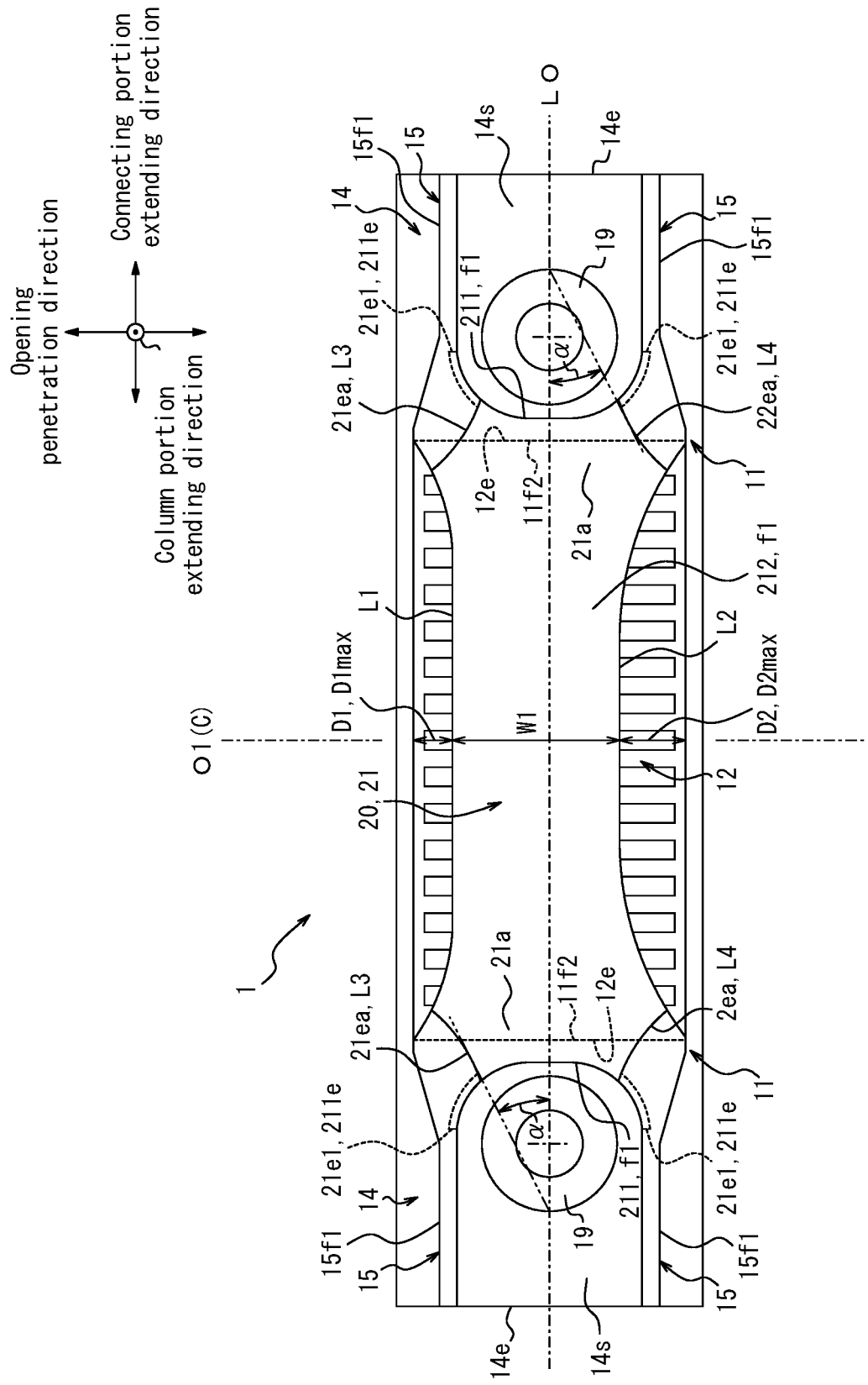
FIG. 2 is a plan view of the bracket of FIG. 1.
Figure 3:
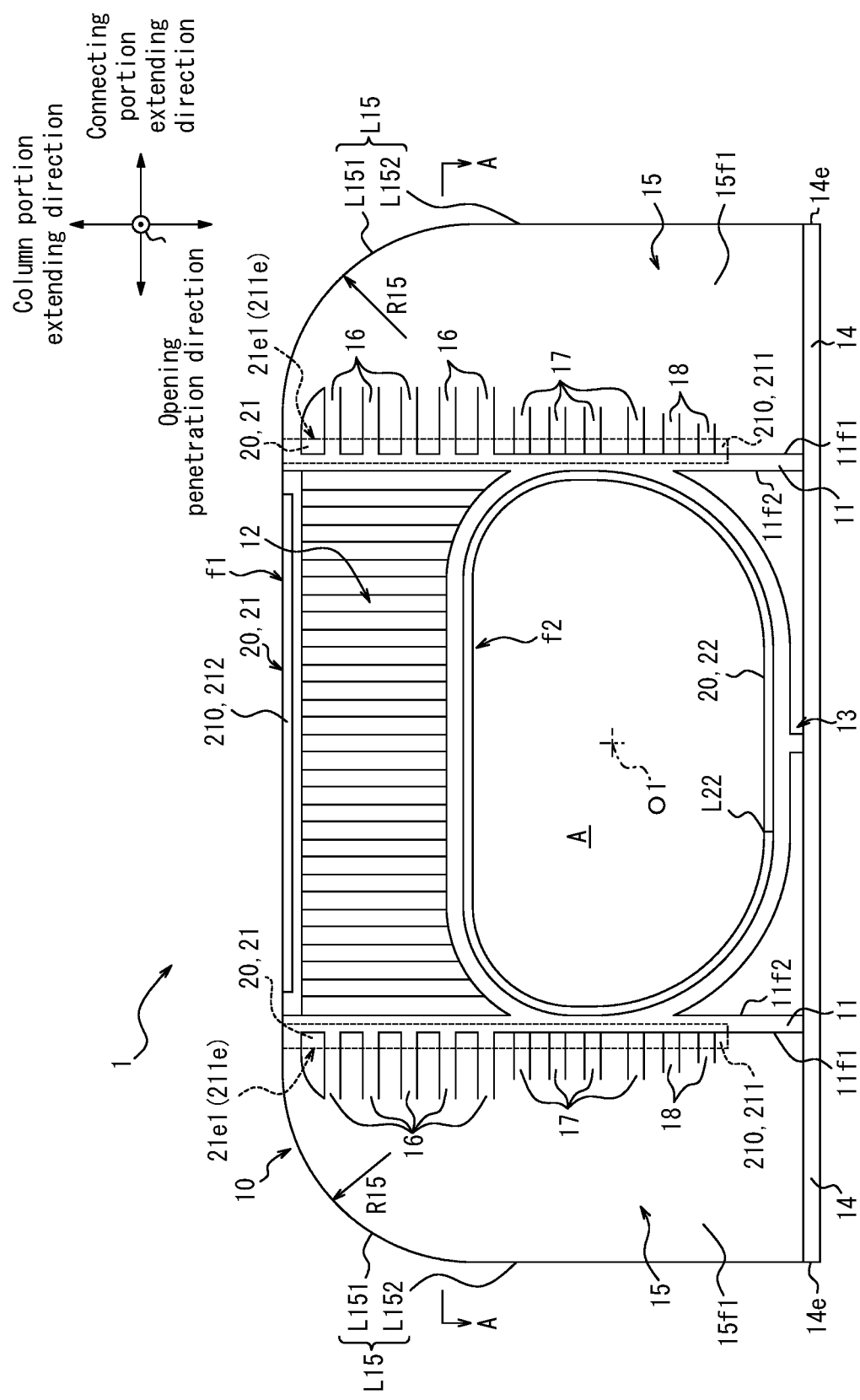
FIG. 3 is a front view of the bracket of FIG. 1.

Furthermore, in the present embodiment, the base portion 13 is further provided with a flange 14 that protrudes more than the column portion 11 along an extension of the connecting portion extending direction. The plate portion 15 is connected to the flange 14. As illustrated in FIG. 2, the flange 14 has a fixing portion 19 for fixing the bracket 1 to the car body. The fixing portion 19 is a seat having an opening through which a fastening element, such as a bolt, can penetrate. In the present embodiment, as illustrated in FIG. 2, the two plate portions 15 of one column portion 11 extend in the connecting portion extending direction, when viewed in the column portion extending direction, so as to cover the fixing portion 19 in the opening penetration direction. In other words, in the present embodiment, the plate portions 15 extend in the connecting portion extending direction to a position beyond the fixing portion 19 when viewed in the column portion extending direction, as illustrated in FIG. 2. In particular, as illustrated in FIG. 3, in the present embodiment, a bracket outer peripheral side ridge L15 of the plate portion 15 extends to a position coinciding with a bracket outer peripheral side edge 14e of the flange 14. Furthermore, in the present embodiment, the bracket outer peripheral side ridge L15 is formed, as illustrated in FIG. 3, by a first contour line L151 and a second contour line L152 connected to the first contour line L151 when viewed in the opening penetration direction. In the present embodiment, the first contour line L151 is a curve connected to the bridging portion 12 with a radius of curvature R15. The second contour line L152 is a straight line extending in the column portion extending direction. In the present embodiment, the plate portion 15 is connected to the flange 14 together with the column portion 11, thereby forming a portion of the bracket body 10. In the present embodiment, the flange 14 is provided on both sides in the extending direction of the base portion 13. That is, in the present embodiment, the bracket body 10 has two flanges 14.

The plate portion 15 is provided with ribs 16, 17, 18 that extend from the side of the opening A to the outer peripheral side of the bracket and protrude in the opening penetration direction. In the present embodiment, the ribs 16 to 18 extend in the connecting portion extending direction, i.e., in the extending direction of the bridging portion 12 and the base portion 13. With reference to FIG. 3, the ribs 16 are provided in a region of the plate portion 15 adjacent to the bridging portion 12 (bridging portion side adjacent region). In the present embodiment, a plurality of ribs 16 is disposed in the bridging portion side adjacent region at intervals in the column portion extending direction. The ribs 17 are provided in a region of the plate portion 15 that is adjacent to the bridging portion side adjacent region in the column portion extending direction and adjacent to the opening A (opening side adjacent region). In the present embodiment, a plurality of ribs 17 is disposed in the opening side adjacent region at intervals in the column portion extending direction. Furthermore, the ribs 18 are also provided in a region of the plate portion 15 that is adjacent to the opening side adjacent region in the column portion extending direction and adjacent to the base portion 13 (base portion side adjacent region). In the present embodiment, a plurality of ribs 18 is disposed in the base portion side adjacent region at intervals in the column portion extending direction. In the present embodiment, the ribs 16 are long ribs having the longest length among the three ribs 16 to 18. In the present embodiment, the ribs 17 are intermediate ribs having a shorter length than the ribs 16. Furthermore, in the present embodiment, the rib 18 is a short rib having a shorter length than the rib 17 and the shortest length among the three ribs 16 to 18. In the present embodiment, the ribs 18 are further configured as a plurality of ribs that have decreasing length with increased distance from the opening side adjacent region. As illustrated in FIG. 1, in the present embodiment, the ribs 16, 17, 18 protrude from both the column portion 11 and the plate portion 15. Specifically, the ribs 16, 17, 18 protrude in the column portion extending direction from the bracket outer peripheral side face 11f1 of the column portion 11 and protrude in the opening penetration direction from an outer face 15f1 of the plate portion 15.

Figure 4A:
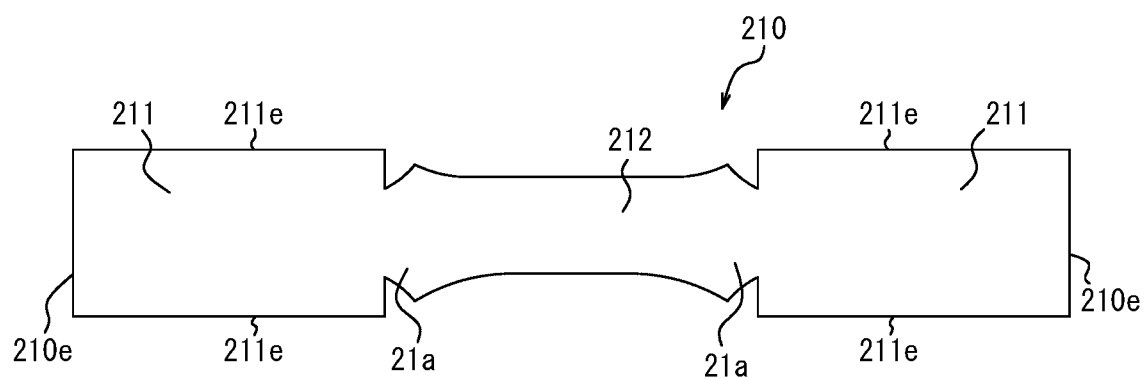
FIG. 4A is a plan view illustrating an example of a reinforcement member configuring a bracket outer peripheral side reinforcement portion.
Figure 4B:
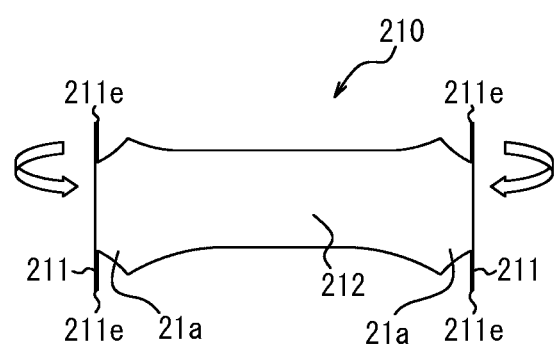
FIG. 4B is a plan view illustrating the reinforcement member of FIG. 4A in a bent state.

The reinforcement portion 20 includes a bracket outer peripheral side reinforcement portion 21. As illustrated in FIG. 1, the bracket outer peripheral side reinforcement portion 21 forms the outer peripheral face f1 of the bracket 1. In the present embodiment, the bracket outer peripheral side reinforcement portion 21, together with the bridging portion 12 and the two column portions 11 of the bracket body 10, forms the outer peripheral face f1 of the bracket 1. In the present embodiment, the bracket outer peripheral side reinforcement portion 21 is configured by a band-shaped reinforcement member. FIG. 4A illustrates a band-shaped reinforcement member 210 as an example of a reinforcement member forming the bracket outer peripheral side reinforcement portion 21. The reinforcement member 210 has a bridging side portion 212 corresponding to the bridging portion 12 and two column side portions 211 corresponding to the column portions 11. The reinforcement member 210 can be bent so that the two longitudinal ends 210e of the reinforcement member 210 are oriented in the same direction. FIG. 4B illustrates the state in which the reinforcement member 210 is bent. As illustrated in FIG. 4B, the reinforcement member 210 can be bent into a U-shape with the bridging side portion 212 as a base and the two column side portions 211 extending in the same direction. Consequently, if the bracket body 10 is injection-molded with the reinforcement member 210 as an insert, then as illustrated in FIG. 1, the reinforcement member 210 forms the outer peripheral faces f1 of the bracket 1 together with the bridging portion 12 and the two column portions 11 of the bracket body 10.

Figure 5:
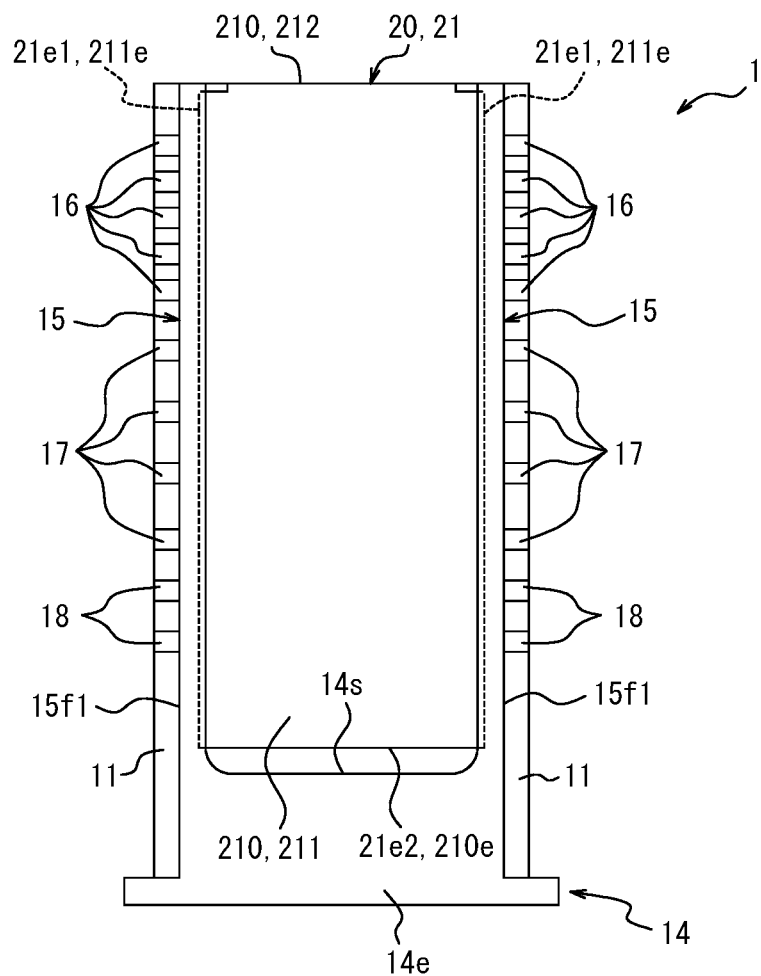
FIG. 5 is a side view of the bracket of FIG. 1.
Figure 5:
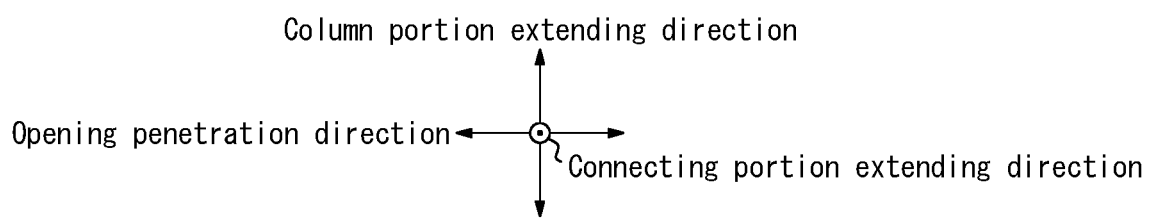

FIG. 5 is a side view of the bracket 1. In the present embodiment, a step 14s provided in the flange 14 is arranged between the two plate portions 15 of one column portion 11. The step 14s is raised from the flange 14 in the column portion extending direction and is integrally formed with the column portion 11 and the two plate portions 15. The bracket 1 has a symmetrical shape in the connecting portion extending direction. That is, in the present embodiment, the left and right side views of the bracket 1 are the same as the left side view of the bracket 1. In the present embodiment, the longitudinal end 210e of the reinforcement member 210 does not extend to the step 14s, but the longitudinal end 210e of the reinforcement member 210 can extend to the step 14s. Accordingly, the longitudinal end 210e of the reinforcement member 210, i.e., the column portion extending direction end 21e2 of the bracket outer peripheral side reinforcement portion 21, can be extended up to the step 14s.

Furthermore, as illustrated in FIG. 3, the bracket outer peripheral side reinforcement portion 21 is arranged to overlap the ribs 16 to 18 when viewed in the opening penetration direction. In detail, as illustrated in FIG. 3, the opening penetration direction ends 21e1 of the bracket outer peripheral side reinforcement portion 21 are arranged so that the bracket outer peripheral side reinforcement portion 21 overlaps the ribs 16 to 18 when viewed in the opening penetration direction. Referring to FIGS. 4A and 4B, in the present embodiment, the opening penetration direction ends 21e1 of the bracket outer peripheral side reinforcement portion 21 are the widthwise ends 211e of the column side portions 211 of the reinforcement member 210. Referring to FIG. 2, the opening penetration direction ends 21e1 of the bracket outer peripheral side reinforcement portion 21 extend to the plate portions 15 when viewed in the column portion extending direction.

Referring to FIG. 3, according to the bracket 1 of the present disclosure, the bracket body 10 includes a plate portion 15 on at least one of the two column portions 11, and furthermore, the plate portion 15 includes ribs 16 to 18 extending from the side of the opening A of the bracket 1 towards the outer periphery of the bracket. As a result, the bracket 1 according to the present disclosure has a higher reinforcing effect on the bracket body 10 than a known bracket. Also, according to the bracket 1 of the present disclosure, the bracket outer peripheral side reinforcement portion 21 is provided on the two column portions 11 and the bridging portion 12 of the bracket body 10, and furthermore, the bracket outer peripheral side reinforcement portion 21 is arranged so that the bracket outer peripheral side reinforcement portion 21 overlaps the ribs 16 to 18 when viewed in the opening penetration direction. This further enhances the reinforcing effect on the bracket body 10. Therefore, the bracket 1 according to the present disclosure has an excellent reinforcing effect.

To explain this effect in detail, when the bracket 1 is mounted on a vehicle, the bridging portion 12 of the bracket body 10 is subjected to a large load in the vehicle up-down direction from the anti-vibration member. In contrast, in the present embodiment, the bridging side portion 212 of the bracket outer peripheral side reinforcement portion 21 reinforces the bridging portion 12 of the bracket body 10. As a result, an excellent reinforcing effect is achieved in the present embodiment against a load applied in the vehicle up-down direction, in particular, against a load applied in the vehicle upward direction. In addition, when the bracket 1 is mounted on a vehicle, the column portions 11 of the bracket body 10 are subjected to a large load in the vehicle front or vehicle rear direction from the anti-vibration member. In contrast, in the present embodiment, the column side portions 211 of the bracket outer peripheral side reinforcement portion 21 reinforce the column portions 11 of the bracket body 10. As a result, an excellent reinforcing effect is achieved in the present embodiment against a load applied in the vehicle front direction or the vehicle rear direction. In particular, in the present embodiment, the plate portions 15 are provided on each of the two column portions 11. As a result, an excellent reinforcing effect is achieved in the present embodiment against a load applied in the vehicle front-rear direction. Also, in the present embodiment, the plate portions 15 are connected to the flanges 14 together with the column portions 11. As a result, the reinforcing effect on the bracket body 10 is further enhanced in the present embodiment. In addition, in the present embodiment, the plate portion 15 includes ribs 16 to 18 integrally formed with the column portion 11. As a result, an excellent reinforcing effect is achieved against loads applied in the vehicle up-down direction, the vehicle front-rear direction, and also the vehicle left-right direction (opening penetration direction). Furthermore, as illustrated in FIG. 3, in the present embodiment, the bracket outer peripheral side reinforcement portion 21 is arranged to overlap the ribs 16 to 18 when viewed in the opening penetration direction. In the present embodiment, the column side portions 211 of the bracket outer peripheral side reinforcement portion 21 reinforce the column portions 11 of the bracket body 10 together with the plate portions 15. This further enhances the reinforcing effect against loads applied in the vehicle up-down direction, the vehicle front-rear direction, and the vehicle left-right direction. Therefore, the bracket 1 according to the present embodiment achieves an excellent reinforcing effect.

According to the present disclosure, the bracket outer peripheral side reinforcement portion 21 can overlap and cover the entire rib 16, which is a long rib, as viewed in the opening penetration direction. However, in the present embodiment, as illustrated in FIG. 3, the column side portion 211 of the bracket outer peripheral side reinforcement portion 21 is not actively arranged up to the region overlapping with the rib 16 within the region of the plate portion 15 of the bracket body 10. In this case, the reinforcing effect for the bracket body 10 can be improved while suppressing an increase in the weight of the bracket 1 that may be caused by the provision of the bracket outer peripheral side reinforcement portion 21.

According to the present disclosure, the reinforcement portion 20 includes a bracket inner peripheral side reinforcement portion 22. The bracket inner peripheral side reinforcement portion 22 forms an inner peripheral face f2 of the bracket 1. In the present embodiment, the bracket inner peripheral side reinforcement portion 22 is provided on the inner peripheral surface of the bracket body 10. In the present embodiment, the inner peripheral surface of the bracket body 10 is formed by the pair of column portions 11 and the pair of connecting portions 12 and 13. In this case, the bracket 1 includes the bracket inner peripheral side reinforcement portion 22 together with the bracket outer peripheral side reinforcement portion 21. As a result, the bracket 1 according to the present disclosure has a higher reinforcing effect on the bracket body 10 than a known bracket provided with only one reinforcement portion. In this case, the bracket 1 has an even better reinforcing effect.

Figure 6A:
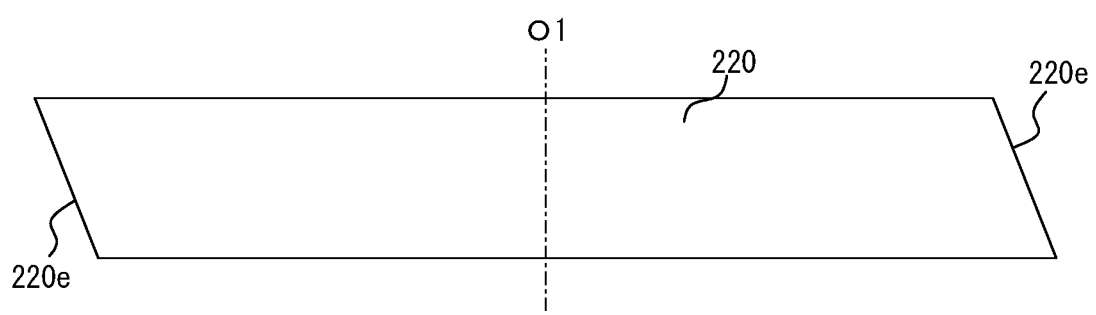
FIG. 6A is a plan view illustrating an example of a reinforcement member configuring a bracket inner peripheral side reinforcement portion.
Figure 6B:
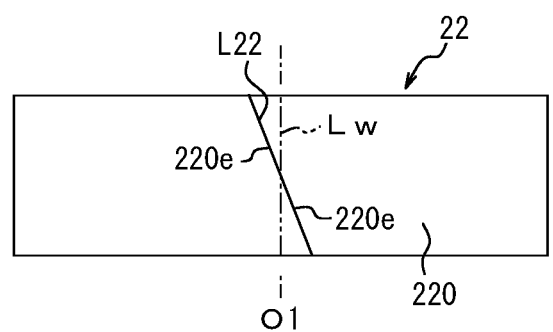
FIG. 6B is a plan view illustrating the reinforcement member of FIG. 6A in a bent state.

Furthermore, according to the present disclosure, the bracket inner peripheral side reinforcement portion 22 is a band-shaped reinforcement member and is formed in an annular shape by joining the two longitudinal ends of the reinforcement member. A joint L22 formed by joining the two longitudinal ends 220e is preferably inclined relative to the opening penetration direction. In the present embodiment, the bracket inner peripheral side reinforcement portion 22 is a band-shaped reinforcement member. FIG. 6A illustrates a band-shaped reinforcement member 220 as an example of a reinforcement member forming the bracket inner peripheral side reinforcement portion 22. As illustrated in FIG. 6A, the reinforcement member 220 is a parallelogram in plan view. The two longitudinal ends 220e of the reinforcement member 220 are inclined ends that are inclined in parallel in the same direction in plan view, as illustrated in FIG. 6A. The reinforcement member 220 can be bent so that the two longitudinal ends 220e of the reinforcement member 220 are oriented in the same direction. FIG. 6B illustrates the state in which the reinforcement member 220 is bent. As illustrated in FIG. 6B, the reinforcement member 220 can be bent into an annular shape by joining the two longitudinal ends 220e of the reinforcement member 220. Furthermore, as illustrated in FIG. 6B, the joint L22 formed by joining the two longitudinal ends 220e is inclined relative to the opening penetration direction (the central axis O1 of the opening A).

An anti-vibration device is generally provided with a bracket for mounting the anti-vibration member. The amount of movement of a connecting portion of the anti-vibration member (for example, an inner cylinder part connected to the bracket via rubber) attached to the opening of the bracket is limited by contact with the bracket when a large load is applied to the connecting portion. Topologically, the load may be applied to the bracket from the inside of a hole (opening) formed in the bracket to the outside, and this is often the case. For this reason, in the present embodiment, the reinforcement portion 20 is provided on both the inner peripheral side and the outer peripheral side of the bracket body 10.

On the other hand, depending on the conditions under which the load is applied, a reinforcement portion may be provided over the entire inner peripheral surface of the bracket body. In this case, if a band-shaped reinforcement member is used as the reinforcement portion and the two longitudinal ends of the band-shaped reinforcement member are joined by a butt-joint, the bracket inner peripheral side reinforcement portion can be formed in an annular (tubular) shape along the inner peripheral surface of the bracket body. However, in this case, if the joint of the reinforcement member extends in parallel to the opening penetration direction, for example, no reinforcing effect is achieved for the joint against a force along the peripheral direction of the inner peripheral surface of the bracket body.

To address this, in the present embodiment, as illustrated in FIG. 1, the joint L22 of the reinforcement member 220 is inclined relative to the opening penetration direction (the central axis O1 of the opening A). In this case, in the bracket inner peripheral side reinforcement portion 22, a point where there is no reinforcing effect against a force along the peripheral direction of the inner peripheral face f2 of the bracket 1 can be eliminated. In the present embodiment, as illustrated in FIG. 6A, the two longitudinal ends 220e of the band-shaped reinforcement member 220 are cut diagonally, and the two longitudinal ends 220e are joined, as illustrated in FIG. 6B. In this case, at the bracket inner peripheral side reinforcement portion 22, the reinforcing effect against a force along the peripheral direction of the inner peripheral face f2 of the bracket 1 and a force perpendicular to or inclined relative to the inner peripheral face f2 of the bracket 1, that is, a force to bend the inner peripheral face f2 of the bracket 1, can be improved.

In the bracket 1 of the present disclosure, the joint L22 of the reinforcement member 220 can also be configured to intersect a weld line Lw formed in the bracket body 10.

For example, when the bracket body 10 is formed by injection molding or the like, a weld line Lw extending along the central axis O1 of the opening A may be formed on the inner peripheral surface of the bracket body 10, as illustrated by the dashed line in FIG. 1. For example, when the weld line Lw extends parallel to the opening penetration direction, the weld line Lw may become an area with room for improvement in the strength against a force along the peripheral direction of the inner peripheral surface of the bracket body 10. Therefore, as illustrated in FIG. 6B, if the bracket inner peripheral side reinforcement portion 22 is configured so that the joint L22 of the reinforcement member 220 overlaps the weld line Lw to intersect the weld line Lw, then in the peripheral direction of the inner peripheral surface of the bracket body 10, a force occurring at the weld line Lw in a direction orthogonal to the weld line Lw can be received by the joint L22 (the two longitudinal ends 220e) of the reinforcement member 220. In this case, the weld line Lw present in the bracket body 10 can be reinforced.

On the contrary, in the bracket 1 of the present disclosure, the joint L22 of the reinforcement member 220 is preferably formed at a position that does not intersect the weld line Lw.

As described above, no reinforcing effect is achieved at the joint L22 of the reinforcement member 220 against a force generated in a direction orthogonal to the joint L22. Hence, even when the bracket inner peripheral side reinforcement portion 22 is formed by the band-shaped reinforcement member 220, the reinforcing effect for the weld line Lw is thought to decrease at the joint L22 of the reinforcement member 220. As illustrated in FIG. 1, in the present embodiment, the joint L22 of the reinforcement member 220 is therefore shifted from the weld line Lw, which has low strength, to be arranged at a position not intersecting the weld line Lw. In this case, since the joint L22 of the reinforcement member 220 does not overlap with the weld line Lw, the entire weld line Lw can be reliably reinforced by the bracket inner peripheral side reinforcement portion 22.

As illustrated in FIG. 2, according to the present disclosure, the bracket outer peripheral side reinforcement portion 21 preferably has a tapered portion 21a that is tapered from the bridging portion 12 towards the plate portion 15 when viewed in the column portion extending direction. This further improves the durability of the bracket.

In detail, as illustrated in FIG. 2, two opening penetration direction ends 21ea of the bracket outer peripheral side reinforcement portion 21, which form the tapered portion 21a of the bracket outer peripheral side reinforcement portion 21, are respectively formed by opening penetration direction side contour lines L3 and L4 when viewed in the column portion extending direction. The two opening penetration direction side contour lines L3 and L4 are respectively inclined by an angle α with respect to the bracket widthwise center line LO when viewed in the column portion extending direction, as illustrated in FIG. 2. The angle α is, as illustrated in FIG. 2, an acute angle inclined towards the bracket widthwise center line LO from the column portion 11 towards to the bridging portion 12 when viewed in the column portion extending direction. The angle α is preferably 60° or less, more preferably 10° or more and 45° or less, and even more preferably 10° or more and 40° or less. The angle α can be set appropriately according to the shape, material, and application of the bracket 1.

The bracket 1 can be injection molded using a reinforcement member made of a fiber reinforced plastic, such as prepreg, as an insert, as described above.

Reinforcement members made of fiber reinforced plastic are, however, generally more rigid than the base resin forming the bracket body 10. For this reason, when a large load is input to the bracket 1 after insert molding, stress is concentrated on the base material resin in the vicinity of the edges of the reinforcement portion 20 (the boundary lines between the base material resin forming the bracket body 10 and the fiber member forming the reinforcement portion 20), and an efficient reinforcing effect might not be obtained.

In contrast, in the present embodiment, as illustrated in FIG. 2, the tapered portion 21a that is tapered from the bridging portion 12 towards the plate portion 15 when viewed in the column portion extending direction is formed in the bracket outer peripheral side reinforcement portion 21, so that mainly the two opening penetration direction ends 21ea of the tapered portion 21a of the bracket outer peripheral side reinforcement portion 21 (opening penetration direction side contour lines L3 and L4) are inclined relative to the tensile stress generation direction (in the present embodiment, the extending direction of the bridging portion 12). In this case, the length in the extending direction of the opening penetration direction end of the bracket outer peripheral side reinforcement portion 21 is stretched (inclined) in the extending direction of the bridging portion 12 at the opening penetration direction ends 21ea of the tapered portion 21a to disperse the locations at which stress is generated by the difference in rigidity between the base resin (bracket body 10) and the reinforcement portion 20. This prevents stress from concentrating on the bracket body 10 at the boundary line between the bracket outer peripheral side reinforcement portion 21 and the bracket body 10, thereby achieving an efficient reinforcing effect. In the case in which a plurality of plate portions 15 spaced apart in the opening penetration direction are arranged as the plate portion 15, as in the present embodiment, the opening penetration direction end 21ea of the tapered portion 21a is preferably provided at both opening penetration direction ends of the bracket outer peripheral side reinforcement portion 21. However, in accordance with the present disclosure, the opening penetration direction end 21ea of the tapered portion 21a can also be just one of the two opening penetration direction side contour lines L3 and L4.

In the bracket 1 according to the present disclosure, the plate portion 15 preferably includes two plate portions 15 spaced apart in the opening penetration direction, and the bracket outer peripheral side reinforcement portion 21 preferably further extends from the bridging portion 12 between the two plate portions 15 in the column portion extending direction. This further improves the durability of the bracket.

In the present embodiment, as illustrated in FIG. 1, the column side portion 211 of the bracket outer peripheral side reinforcement portion 21 extends from the tapered portion 21a between the two plate portions 15 in the column portion extending direction. In the present embodiment, the column side portion 211 is an extension connecting to the tapered portion 21a of the bracket outer peripheral side reinforcement portion 21. This further improves the durability of the bracket.

As illustrated in FIG. 2, in the present embodiment, the width W1 in the opening penetration direction of the bridging portion 12 is greatest at an extending direction end 12e of the bridging portion 12 when viewed in the column portion extending direction. In the present embodiment, the extending direction end 12e of the bridging portion 12 coincides with the bracket inner peripheral side face 11f2 of the column portion 11 in the connecting portion extending direction.

Specifically, in the present embodiment, the width W1 in the opening penetration direction of the bridging portion 12 narrows from the extending direction end 12e of the bridging portion 12 towards the extending direction center C of the bridging portion 12 when viewed in the column portion extending direction, as illustrated in FIG. 2. In this case, an increase in weight can be suppressed by narrowing the center C in the extending direction of the bridging portion 12 while securing the strength of the connecting portion of the column portion 11 and the bridging portion 12 in the bracket body 10, at which stress tends to concentrate when a load is input to the bracket 1.

In detail, in the present embodiment, a first one of the opening penetration direction side contour lines L1 and L2 forming the opening penetration direction side contour of the bridging portion 12 is preferably a concave curve that approaches a second one of the opening penetration direction side contour lines L1 and L2 from the extending direction end 12e of the bridging portion 12 toward the extending direction center C of the bridging portion 12 when viewed in the column portion extending direction, as illustrated in FIG. 2. In the present embodiment, the first opening penetration direction side contour line L1 is a concave curve that approaches the second opening penetration direction side contour line L2 from the extending direction end 12e of the bridging portion 12 toward the extending direction center C of the bridging portion 12. In this case, the width W1 in the opening penetration direction of the bridging portion 12 decreases smoothly along the first opening penetration direction side contour line L1, thereby suppressing an increase in weight while suppressing a concentration of stress that may occur on the first opening penetration direction side contour line L1.

In detail, in the present embodiment, the second one of the opening penetration direction side contour lines L1 and L2 forming the opening penetration direction side contour of the bridging portion 12 is preferably also a concave curve that approaches the first one of the opening penetration direction side contour lines L1 and L2 from the extending direction end 12e of the bridging portion 12 toward the extending direction center C of the bridging portion 12 when viewed in the column portion extending direction, as illustrated in FIG. 2. In the present embodiment, the second opening penetration direction side contour line L2 is a concave curve that approaches the first opening penetration direction side contour line L1 from the extending direction end 12e of the bridging portion 12 toward the extending direction center C of the bridging portion 12. In this case, the width W1 in the opening penetration direction of the bridging portion 12 decreases smoothly along the second opening penetration direction side contour line L2, thereby suppressing an increase in weight while suppressing a concentration of stress that may occur on the second opening penetration direction side contour line L2.

In the present embodiment, a depth D1 in the opening penetration direction of the concavity of the first opening penetration direction side contour line L1 of the bridging portion 12 is preferably different from a depth D2 in the opening penetration direction of the concavity of the second opening penetration direction side contour line L2 when viewed in the column portion extending direction.

When the bracket body 10 is injection molded with the reinforcement members 210 and 220 as inserts, the weld line Lw can occur in the bracket body 10, as described above. The weld line Lw can be a starting point for peeling of the bracket body 10 when an excessive load is applied to the bracket 1. For this reason, the weld line Lw is preferably formed by envisioning the use conditions of the bracket 1 and avoiding the position where a large load will be applied. However, if there are restrictions on the injection gate position in terms of design or structure, the position of the weld line Lw may be unambiguously determined. It is difficult to control the weld line Lw to avoid the concentration of stress in this case due to the limitations on changing the injection gate position.

Figure 7:
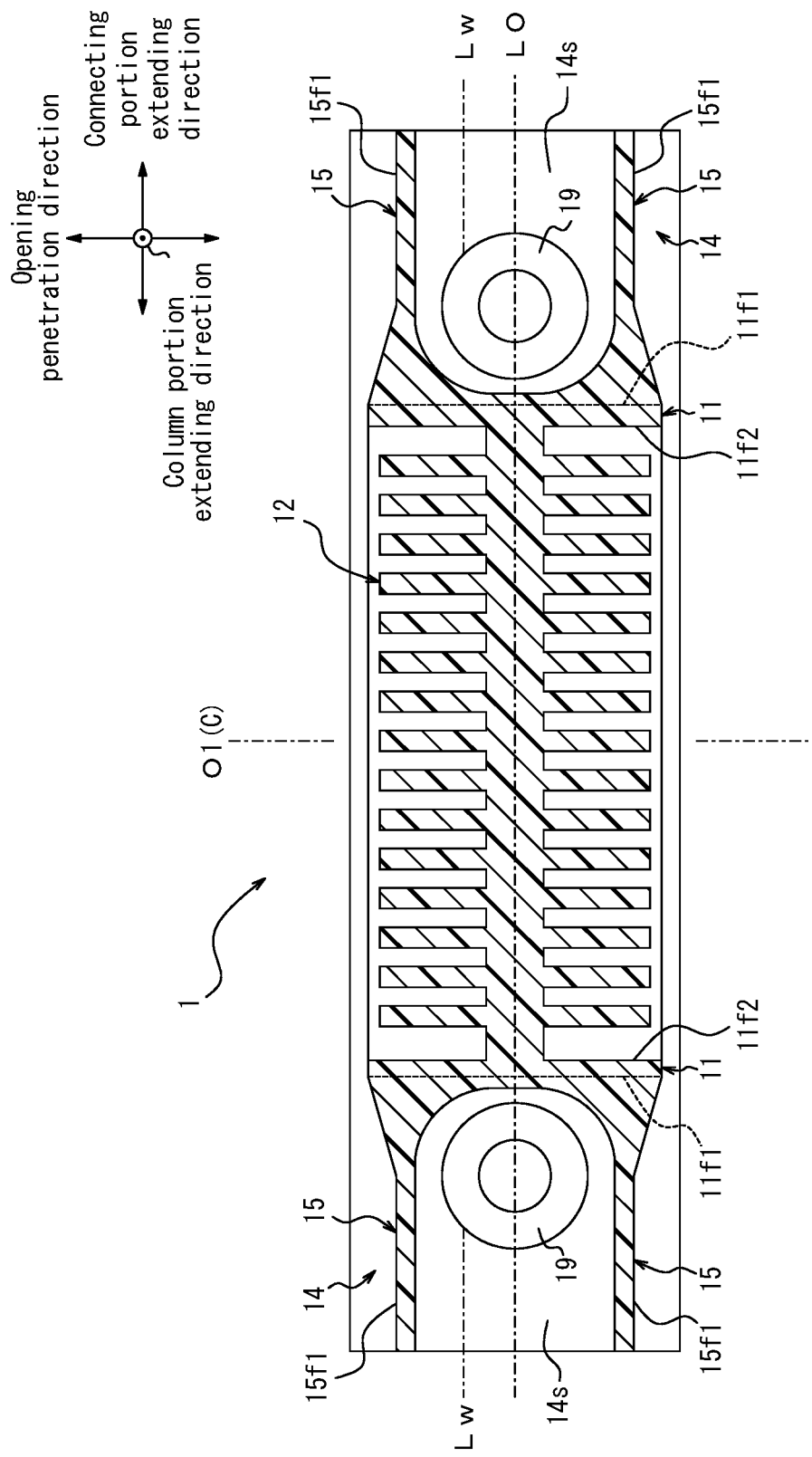
FIG. 7 is a cross-sectional view along line A-A of FIG. 3.

For example, as illustrated in FIG. 7, if the weld line Lw extends along the connecting portion extending direction when viewed in the column portion extending direction, and the depth D1 in the opening penetration direction of the first opening penetration direction side contour line L1 and the depth D2 in the opening penetration direction of the second opening penetration direction side contour line L2 are different as illustrated in FIG. 2, then the weld line Lw can be formed to be closer to whichever of the opening penetration direction side contour lines L1 and L2 has the shallower one of the depths D1 and D2 in the opening penetration direction. In other words, the position of the weld line WL can be controlled by adjusting the two depths D1 and D2 in the opening penetration direction. Therefore, by adjusting the depths D1 and D2 in the opening penetration direction as appropriate, the weld line Lw can be shifted away from the position where a large load is applied to the bracket 1.

On the other hand, referring to FIG. 7, in a bracket such as that of the present embodiment, the external force applied to the bridging portion 12 of the bracket body 10 generally acts along the bracket widthwise center line L0 when the opening penetration direction depths D1 and D2 are the same. Here, the bracket widthwise center line LO is a straight line parallel to the connecting portion extending direction and passing through the center of the opening penetration direction width of the bridging portion 12.

In contrast, in the present embodiment, the maximum value D1max of the depth D1 in the opening penetration direction is shallower than the maximum value D2max of the depth D2 in the opening penetration direction. In this case, as illustrated in FIG. 7, the weld line Lw tends to be formed by the shallower depth D1 in the opening penetration direction. That is, according to the present embodiment, the weld line Lw is formed closer to the first opening penetration direction side contour line L1 with the shallow depth D1 in the opening penetration direction depth, as illustrated in FIG. 7. In this case, for example, even if a load that is input to the bracket 1 causes a concentration of stress along the bracket widthwise center line LO, the concentration of stress that may occur along the weld line Lw is suppressed by virtue of the weld line Lw being shifted from the bracket widthwise center line LO in the opening penetration direction. Therefore, according to the present embodiment, the bracket has even better durability.

As illustrated in FIG. 3, in the present embodiment, the base portion 13 is further provided with a flange 14 protruding from the column portion 11 along an extension of the connecting portion extending direction. As described above, in the present embodiment, the flange 14 and the plate portion 15 are connected. This further improves the durability of the bracket 1. In the present embodiment, the bracket body 10 includes two flanges 14 to correspond to the two plate portions 15. This further improves the durability of the bracket.

The foregoing is merely a description of an embodiment of the present disclosure, and a variety of changes may be made within the scope of the patent claims. For example, the reinforcement portion 20 is not limited to including a fiber reinforced plastic such as prepreg. According to the present disclosure, the reinforcement portion 20 can also be injection molded together with the bracket body 10 using a fiber reinforced thermoplastic (FRTP) in which the aforementioned fibrous element is mixed with a thermoplastic resin. Furthermore, the shapes of the reinforcement members 210 and 220 can be modified to suit the shapes of the outer peripheral face f1 and the inner peripheral face f2 of the bracket 1. Additionally, the opening A of the bracket 1 according to the present embodiment has a rectangular shape when viewed in the opening penetration direction but can have an elliptical or circular shape.

REFERENCE SIGNS LIST

1 Bracket
10 Bracket body
11 Column portion
11f1 Bracket outer peripheral side face of column portion
12 Bridging portion (connecting portion)
13 Base portion (connecting portion)
14 Flange
15 Plate portion
15f1 Outer face of plate portion
16 Rib (long rib)
17 Rib (intermediate rib)
18 Rib (short rib)
20 Reinforcement portion
21 Bracket outer peripheral side reinforcement portion
21a Tapered portion of bracket outer peripheral side reinforcement portion
21e1 Opening penetration direction end of bracket outer peripheral side reinforcement portion
21e2 Column portion extending direction end of bracket outer peripheral side reinforcement portion
210 Reinforcement member
211 Column side portion of reinforcement member
211e Widthwise end of column side portion of reinforcement member
212 Bridging side portion of reinforcement member
22 Bracket inner peripheral side reinforcement portion
220 Reinforcement member
220e Longitudinal end of reinforcement member
f1 Outer peripheral face of bracket
f2 Inner peripheral face of bracket
L22 Joint
Lw Weld line

The invention claimed is:

1. A bracket that has an opening for mounting an anti-vibration member connected to one of a vibration generating side and a vibration receiving side, and that can be connected to an other of the vibration generating side and the vibration receiving side, the bracket comprising:
a bracket body and a reinforcement portion, wherein
the bracket body is made of resin,
the bracket body includes a pair of column portions that are spaced apart and a pair of connecting portions arranged between the pair of column portions and connecting the pair of column portions,
the bracket body further includes at least one plate portion, on at least one column portion in the pair of column portions, extending in an extending direction of the column portion and protruding in an extending direction of the connecting portions more than the column portion, and a rib extending from a side of the opening to a bracket outer peripheral side and protruding in a penetration direction of the opening is provided on the plate portion,
the reinforcement portion includes a bracket outer peripheral side reinforcement portion,
the bracket outer peripheral side reinforcement portion forms an outer peripheral face of the bracket, and
the bracket outer peripheral side reinforcement portion is arranged so as to overlap the rib when viewed in the penetration direction of the opening.

2. The bracket of claim 1, wherein
the reinforcement portion includes a bracket inner peripheral side reinforcement portion, and
the bracket inner peripheral side reinforcement portion forms an inner peripheral face of the bracket.

3. The bracket of claim 2, wherein
the bracket inner peripheral side reinforcement portion is a band-shaped reinforcement member and is formed in an annular shape by joining two longitudinal ends of the reinforcement member, and
a joint formed by joining the two longitudinal ends is inclined relative to the penetration direction of the opening.

4. The bracket of claim 3, wherein the joint intersects a weld line formed in the bracket body.

5. The bracket of claim 3, wherein the joint is formed at a position that does not intersect a weld line formed in the bracket body.

6. The bracket of claim 1, wherein the bracket outer peripheral side reinforcement portion includes a tapered portion that is tapered from one of the connecting portions towards the plate portion when viewed in the extending direction of the column portion.

7. The bracket of claim 1, wherein
the at least one plate portion comprises two plate portions spaced apart in the penetration direction of the opening, and
the bracket outer peripheral side reinforcement portion further extends from the connecting portion between the two plate portions in the extending direction of the column portion.

8. The bracket of claim 2, wherein the bracket outer peripheral side reinforcement portion includes a tapered portion that is tapered from one of the connecting portions towards the plate portion when viewed in the extending direction of the column portion.

9. The bracket of claim 2, wherein
the at least one plate portion comprises two plate portions spaced apart in the penetration direction of the opening, and
the bracket outer peripheral side reinforcement portion further extends from the connecting portion between the two plate portions in the extending direction of the column portion.

10. The bracket of claim 3, wherein the bracket outer peripheral side reinforcement portion includes a tapered portion that is tapered from one of the connecting portions towards the plate portion when viewed in the extending direction of the column portion.

11. The bracket of claim 3, wherein
the at least one plate portion comprises two plate portions spaced apart in the penetration direction of the opening, and
the bracket outer peripheral side reinforcement portion further extends from the connecting portion between the two plate portions in the extending direction of the column portion.

12. The bracket of claim 4, wherein the bracket outer peripheral side reinforcement portion includes a tapered portion that is tapered from one of the connecting portions towards the plate portion when viewed in the extending direction of the column portion.

13. The bracket of claim 4, wherein
the at least one plate portion comprises two plate portions spaced apart in the penetration direction of the opening, and
the bracket outer peripheral side reinforcement portion further extends from the connecting portion between the two plate portions in the extending direction of the column portion.

14. The bracket of claim 5, wherein
the at least one plate portion comprises two plate portions spaced apart in the penetration direction of the opening, and
the bracket outer peripheral side reinforcement portion further extends from the connecting portion between the two plate portions in the extending direction of the column portion.

15. The bracket of claim 6, wherein
the at least one plate portion comprises two plate portions spaced apart in the penetration direction of the opening, and
the bracket outer peripheral side reinforcement portion further extends from the connecting portion between the two plate portions in the extending direction of the column portion.

16. The bracket of claim 8, wherein
the at least one plate portion comprises two plate portions spaced apart in the penetration direction of the opening, and
the bracket outer peripheral side reinforcement portion further extends from the connecting portion between the two plate portions in the extending direction of the column portion.

17. The bracket of claim 10, wherein
the at least one plate portion comprises two plate portions spaced apart in the penetration direction of the opening, and
the bracket outer peripheral side reinforcement portion further extends from the connecting portion between the two plate portions in the extending direction of the column portion.

18. The bracket of claim 12, wherein
the at least one plate portion comprises two plate portions spaced apart in the penetration direction of the opening, and
the bracket outer peripheral side reinforcement portion further extends from the connecting portion between the two plate portions in the extending direction of the column portion.

* * * * *